United States Patent
Gardner et al.

(10) Patent No.: US 8,041,302 B2
(45) Date of Patent: *Oct. 18, 2011

(54) METHOD AND APPARATUS FOR DETERMINING THE TRANSMISSION DATA RATE IN A MULTI-USER COMMUNICATION SYSTEM

(75) Inventors: William R. Gardner, Solana Beach, CA (US); Paul E. Jacobs, San Diego, CA (US); Roberto Padovani, San Diego, CA (US); Noam Ziv, San Diego, CA (US); S. Katherine Lam, San Diego, CA (US); Andrew P. DeJaco, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/544,162

(22) Filed: Oct. 6, 2006

(65) Prior Publication Data

US 2007/0033018 A1  Feb. 8, 2007

Related U.S. Application Data

(60) Continuation of application No. 08/575,304, filed on Dec. 20, 1995, now Pat. No. 7,146,174, which is a division of application No. 08/575,049, filed on Dec. 20, 1995, now Pat. No. 5,857,147, which is a continuation of application No. 08/118,473, filed on Sep. 8, 1993, now abandoned.

(51) Int. Cl.
*H04B 17/00* (2006.01)

(52) U.S. Cl. .................................... 455/67.11

(58) Field of Classification Search ............... None
See application file for complete search history.

(56) References Cited

U.S. PATENT DOCUMENTS

| | | | |
|---|---|---|---|
| 4,638,476 A | 1/1987 | Acampora et al. | |
| 4,701,943 A | 10/1987 | Davis et al. | 379/57 |
| 4,779,267 A | 10/1988 | Limb | |
| 4,864,566 A | 9/1989 | Chauveau | 370/109 |
| 4,893,308 A | 1/1990 | Wilson et al. | 370/109 |
| 4,901,307 A | 2/1990 | Gilhousen et al. | |

(Continued)

FOREIGN PATENT DOCUMENTS

EP  0353759  2/1990

(Continued)

OTHER PUBLICATIONS

International Search Report, PCT/US1994/010087, International Searching Authority, European Patent Office, Dec. 13, 1994.

(Continued)

*Primary Examiner* — Thanh Le
(74) *Attorney, Agent, or Firm* — Timothy Frederick Loomis; Heejong Yoo (57) ABSTRACT

A method and apparatus are described for controlling the data rates for communications to and from a base station and a plurality of remote users. The usage of the communications resource whether the forward link resource (from base station to remote users) or reverse link resource (from remote users to base station) is measured. The measured usage value is compared against at least one predetermined threshold value and the data rates of communications or a subset of communications on said communications resource is modified in accordance with said comparisons.

19 Claims, 9 Drawing Sheets

U.S. PATENT DOCUMENTS

| | | | |
|---|---|---|---|
| 4,910,794 A | 3/1990 | Mahany | 455/67 |
| 5,056,109 A | 10/1991 | Gilhousen et al. | |
| 5,070,536 A | 12/1991 | Mahany et al. | 455/67 |
| 5,103,459 A * | 4/1992 | Gilhousen et al. | 370/206 |
| 5,115,429 A | 5/1992 | Hluchyj et al. | 370/84 |
| 5,119,372 A | 6/1992 | Verbeek | |
| 5,187,707 A | 2/1993 | Chu et al. | |
| 5,193,151 A | 3/1993 | Jain | |
| 5,200,956 A | 4/1993 | Pudney et al. | |
| 5,257,401 A | 10/1993 | Dahlin et al. | 455/33.2 |
| 5,275,401 A | 1/1994 | Llorens | |
| 5,309,474 A | 5/1994 | Gilhousen et al. | 375/1 |
| 5,313,454 A | 5/1994 | Bustini et al. | |
| 5,327,576 A | 7/1994 | Uddenfeldt et al. | 455/33.2 |
| 5,404,355 A | 4/1995 | Raith | |
| 5,414,796 A | 5/1995 | Jacobs et al. | |
| 5,426,640 A | 6/1995 | Hluchyj et al. | |
| 5,517,503 A | 5/1996 | Hess | |
| 5,541,955 A | 7/1996 | Jacobsmeyer | |
| 5,675,742 A | 10/1997 | Jain et al. | |
| 5,857,147 A | 1/1999 | Gardner et al. | |
| 6,317,600 B1 | 11/2001 | Salonaho et al. | |

FOREIGN PATENT DOCUMENTS

| | | |
|---|---|---|
| EP | 0472511 | 2/1992 |
| EP | 0538546 | 4/1993 |
| JP | 1079724 | 3/1989 |
| JP | 4150123 A | 5/1992 |
| JP | 5175915 | 7/1993 |
| JP | 200091985 | 3/2000 |
| WO | WO9210890 | 6/1992 |
| WO | WO9960742 A1 | 11/1999 |

OTHER PUBLICATIONS

Translation of Office Action in Japanese application 2009-261038 corresponding to U.S. Appl. No. 11/544,162, citing JP5175915, WO9210890, JP4150123, JP1079724A2 and WO9960742A1 dated Jan. 25, 2011.

* cited by examiner

METHOD AND APPARATUS FOR DETERMINING THE TRANSMISSION DATA RATE IN A MULTI-USER COMMUNICATION SYSTEM

CLAIM OF PRIORITY UNDER 35 U.S.C. §120

The present application for patent is a Continuation and claims priority to U.S. patent application Ser. No. 08/575,304, entitled "Method and Apparatus for Determining the Transmission Data Rate in a Multi-User Communication System," filed Dec. 20, 1995, now allowed, which is a Divisional of U.S. Pat. No. 5,857,147, entitled "Method and Apparatus for Determining the Transmission Data Rate in a Multi-User Communication System," issued Jan. 5, 1999, which is a File Wrapper Continuation of U.S. patent application Ser. No. 08/118,473, filed Sep. 8, 1993, now abandoned, all assigned to the assignee hereof and hereby expressly incorporated by reference herein.

BACKGROUND

I. Field

The present invention relates to communications systems. More particularly, the present invention relates to a novel and improved method and apparatus for maximizing total average service quality to users in a multi-user communication system by controlling the data transmission rates to and from users of the multi-user communication system.

II. Background

The term "multiple access" refers to the sharing of a fixed communications resource by a plurality of users. A typical example of such a fixed communications resource is bandwidth. There are three basic ways to increase the throughput or data rate of an individual user accessing a communications resource. The first way is to increase the transmitters radiated power or alternatively to reduce system losses so that the received signal to noise ratio (SNR) is increased. The second way is to increase the allocation of bandwidth to the user. The third approach is to make allocation of the communications resource more efficient.

Some of the more common methods of providing multiple access to a communications resource involve both analog and digital communication modulation schemes. Such schemes include frequency division, time division and spread spectrum techniques. In frequency division multiple access (FDMA) techniques, each user is allocated one or more specific sub-bands of frequency. In time division multiple access (TDMA) techniques, periodically recurring time slots are identified, and for each segment of time each user is allocated one or more time slots. In some TDMA systems, users are provided a fixed assignment in time, and in other systems users may access the resource at random times. In spread spectrum communications, users share a common frequency band. Using frequency hopping (FH) modulation, the signal is modulated upon a carrier which changes in frequency according to a predetermined plan. In direct sequence (DS) modulation, the user signal is modulated with a pseudorandom code. In one type of code division multiple access (CDMA) technique which uses direct sequence spread spectrum modulation, a set of orthogonal or nearly orthogonal spread spectrum codes (each using full channel bandwidth) are identified, and each user is allocated one or more specified codes.

In all multiple access schemes, a plurality of users shares a communications resource without creating unmanageable interference to each other in the detection process. The allowable limit of such interference is defined to be the maximum amount of interference such that the resulting transmission quality is still above a predetermined acceptable level. In digital transmission schemes, the quality is often measured by the bit error rate (BER) or frame error rate (FER). In digital speech communications systems, the overall speech quality is limited by data rate allowed for each user, and by the BER or FER.

Systems have been developed to minimize the data rate required for a speech signal while still providing an acceptable level of speech quality. If speech is transmitted by simply sampling and digitizing the analog speech signal, a data rate on the order of 64 kilobits per second (Kbps) is required to achieve a speech quality equivalent to that of a conventional analog telephone. However, through the use of speech analysis, followed by the appropriate coding, transmission, and resynthesis at the receiver, a significant reduction in the data rate can be achieved with a minimal decrease in quality.

Devices which employ techniques to compress speech by extracting parameters that relate to a model of human speech generation are typically called vocoders. Such devices are composed of an encoder, which analyzes the incoming speech to extract the relevant parameters, and a decoder, which resynthesizes the speech using the parameters which are received from the encoder over the transmission channel. As the speech changes, new model parameters are determined and transmitted over the communications channel. The speech is typically segmented into blocks of time, or analysis frames, during which the parameters are calculated. The parameters are then updated for each new frame.

A more preferred technique to accomplish data compression, so as to result in a reduction of information that needs to be sent, is to perform variable rate vocoding. An example of variable rate vocoding is detailed in U.S. Pat. No. 5,414,796 entitled "Variable Rate Vocoder," assigned to the assignee of the present invention and incorporated herein by reference. Since speech inherently contains periods of silence, i.e. pauses, the amount of data required to represent these periods can be reduced. Variable rate vocoding most effectively exploits this fact by reducing the data rate for these periods of silence. A reduction in the data rate, as opposed to a complete halt in data transmission, for periods of silence overcomes the problems associated with voice activity gating while facilitating a reduction in transmitted information, thus reducing the overall interference in a multiple access communication system.

It is the objective of the present invention to modify the variability of the transmission rate of variable rate vocoders, and any other variable rate data source, in order to maximize utilization of the communications resource.

SUMMARY

The present invention is a novel and improved method and apparatus for maximizing total average service quality to users in a multi-user communication system by controlling the data transmission rates to and from users of the multi-user communication system.

In the present invention, usage of the available communication resource is monitored. When the usage of the available communication resource becomes too great for a given communications link, and thus the quality falls below a predetermined limit, the data rate to or from the users is limited to free up a portion of the available communication resource. When the usage of the communications resource becomes small, the data rate to or from the users is allowed to increase above the previous limit.

For example, if the communications link from remote users to a main communications center, hereafter known as the reverse link, becomes overloaded, the main communications center transmits a signaling message requesting that the users, or selected ones of the users, decrease their average transmission data rate. At the remote user end, the signaling message is received and the transmission rate for the remote user is lowered in accordance with the signaling message.

The remote user, in the example, may be transmitting speech data or other digital data. If the user is transmitting speech data, then his transmission data rate may be adjusted using a variable rate vocoder as is described in above mentioned U.S. Pat. No. 5,414,796. The present invention is equally applicable to any variable rate vocoding strategy when the remote user is transmitting speech data. If the user is transmitting digital data that is not speech data, the system can optionally instruct the remote user to modify the transmitted data rate for the specific digital data source.

On the communication link between the main communication center and the remote users, hereafter known as the forward link, the main communication center monitors the fraction of its total resource capacity that is being used for communicating to the remote users. If the fraction of the communications resource being used is too large, the main communication center will decrease the permitted average transmission data rate to each user or a subset of users. If the fraction of the communications resource being used is too small, the main communication center will permit the average data rate for each user to increase. As in the reverse link, the control of the data rate may be selective in nature based upon the nature of the data (speech or non-speech) being transmitted to the remote users.

BRIEF DESCRIPTION OF THE DRAWINGS

The features, objects, and advantages of the present invention will become more apparent from the detailed description set forth below when taken in conjunction with the drawings in which like reference characters are identified correspondingly throughout and wherein.

DETAILED DESCRIPTION

Figure 1:
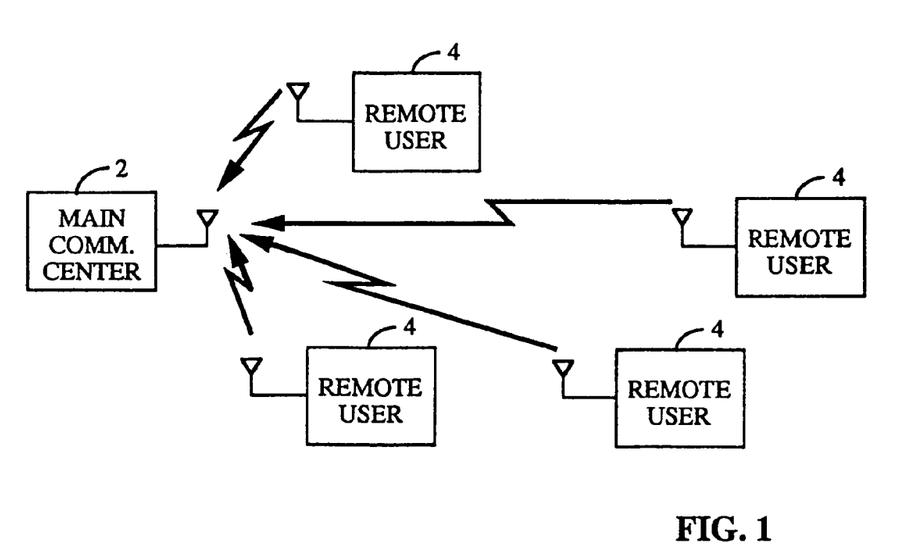
FIG. 1 is a block diagram illustrating multiple remote (mobile) users accessing a main communications center (cell base station)

FIG. 1 illustrates the multi-user communications system communications between remotes users 4 and the main transmission center 2. In the exemplary embodiment these communications are conducted by means of a code division multiple access (CDMA) multi-user scheme, which is detailed in U.S. Pat. No. 4,901,307 entitled "Spread Spectrum Multiple Access Communication System Using Satellite of Terrestrial Repeaters (CDMA)," and U.S. Pat. No. 5,103,459 entitled "System and Method for Generating Signal Waveform in a CDMA Cellular Telephone System (CDMA)," both assigned to the assignee of the present invention and incorporated by reference herein. The communications that occur from the remote users to the main transmission center are referred to as reverse link communications. The communications link that enables communications from remote users 4 to a cell base station 2 is referred to as the reverse link. In a CDMA system, system user capacity is a function of the level of interference in the system.

Figure 2:
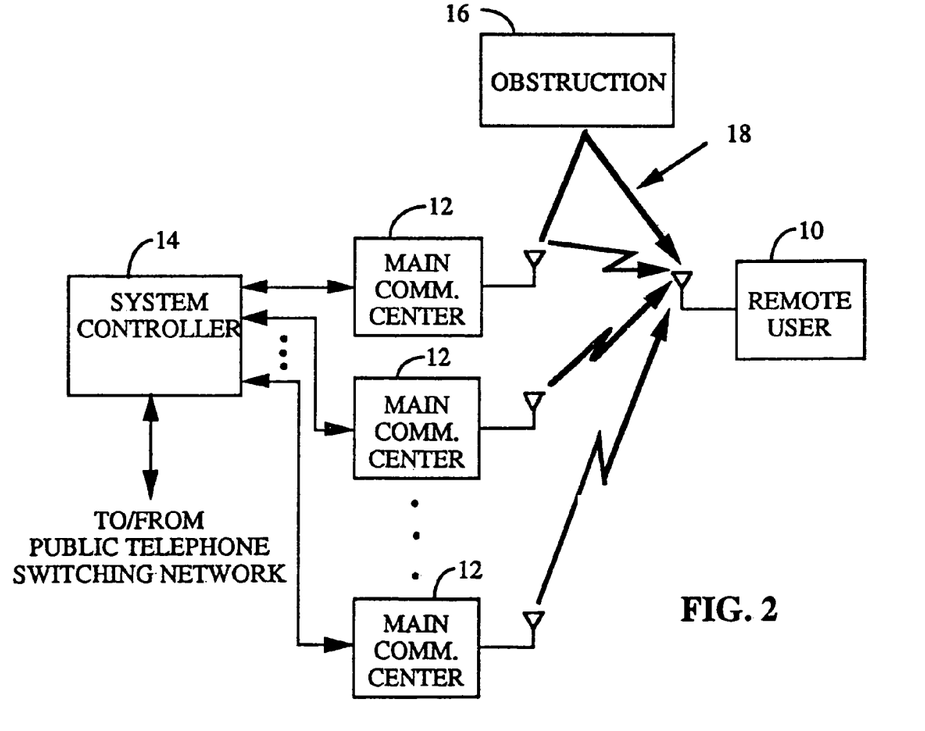
FIG. 2 is a block diagram illustrating the effects of a multi-cell (multiple main communications centers) environment on data reception at a remote (mobile) user.

FIG. 2 illustrates the two main issues that result in the need for the control of the data rate to reduce interference and increase capacity. In the exemplary embodiment of a CDMA multi-cell cellular communications network, the main capacity limit on forward link communications is the interference from neighboring cells as illustrated by the propagation lines drawn from the cell base stations 12 and the single remote user or mobile station 10. The second effect on forward link capacity in the present embodiment is illustrated by the second propagation path 18 from a single cell base station to a mobile station 10. The cause of this effect, known as multi-path, is reflection off of obstruction 16 which may take the form of a building, a mountain, or any other object that is capable of reflecting electromagnetic waves.

In the exemplary embodiment, interference is received by remote user 10 from cell base stations 12 which are not communicating with the remote user, and interference is received by multipath signals from obstruction 16. In the exemplary embodiment, the operation of a group of cells is overseen by the system controller 14 that provides the data to and from a public telephone switching network (not shown). These communications are referred to as forward link communications.

In systems like time division multiple access (TDMA) and frequency division multiple access (FDMA), a "hard" capacity limit exists due to the finite number of time slot or frequency sub-band divisions, respectively. When all of the time slots or subbands are allocated to users, the "hard" capacity limit is reached and service to any additional user is impossible. Though the users that have accessed the system before the capacity limit remain unaffected by any excluded users, the average quality of service to all users drops beyond the capacity limit since the quality of service for each additional user denied service is zero.

In multiple access schemes such as code division multiple access (CDMA) and random access systems like ALOHA and slotted ALOHA systems, a "soft" capacity limit exists. For these types of multiple access systems, the increase of the number of system users beyond a capacity limit causes a decrease in the quality of service to all users of the system. In a CDMA system, the transmissions of each user are seen as interference, or noise, to each other user. Beyond the soft capacity limit of a CDMA system, the noise floor becomes large enough to cause the predetermined allowable BER or FER to be exceeded. In random access schemes, each additional user increases the probability of a message collision. Beyond a capacity limit the message collisions grow so frequent that the need for retransmission or the resultant lost data causes the communication quality of all users to suffer.

Figure 3:
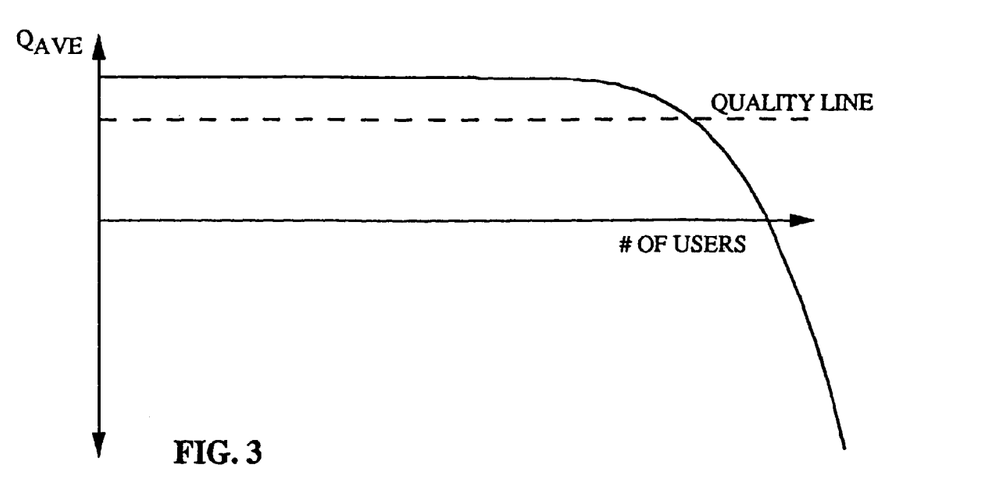
FIG. 3 is a graph of average service quality versus number of users at a particular average transmission data rate.

FIG. 3 is a graph of the average quality of service to users of such a multiple access communication system versus the number of users occupying the system, given a specified average data rate for all users. The average quality ($Q_{ave}$) of service is defined as:

$$Q_{ave} = \frac{1}{N} \sum_{i=1}^{N} Q_i \quad (1)$$

where Qi is quality of service to user i and N is the number of users on the system.

FIG. 3 also illustrates a quality line above which the average service quality is acceptable and below which the service quality is unacceptable. The intersection of the quality line with the plot of quality versus number of users curve defines the capacity limit of the system at the data rate of the system. In the exemplary embodiment of a CDMA system, messages are transmitted in 20 ms frames, and a tolerable frame error rate of 1% dictates the position of the quality line in the exemplary embodiment. It is understood that different frame sizes and error rates are equally applicable to the present invention.

Figure 4:
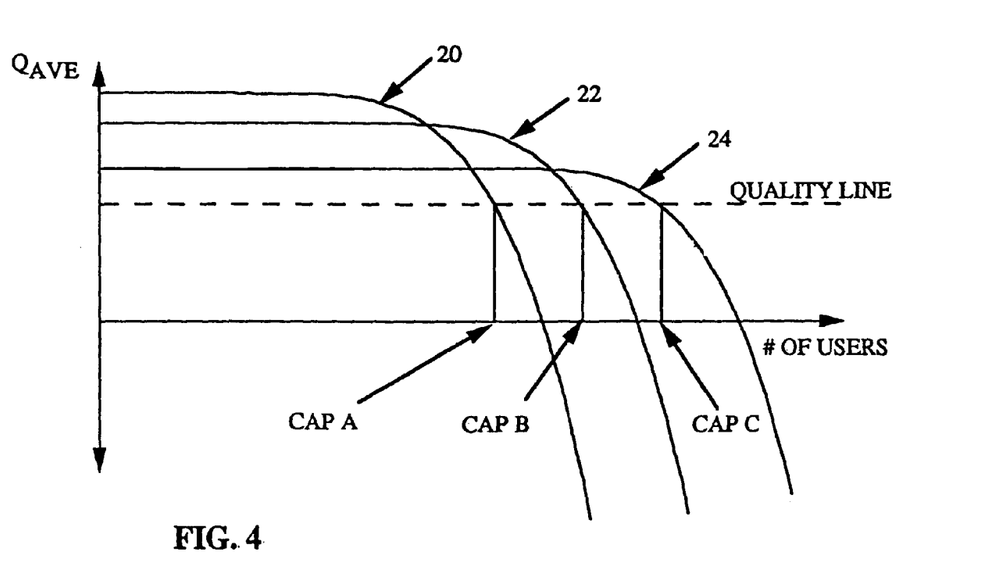
FIG. 4 is a graph of average service quality versus number of users for three different average transmission data rates.

FIG. 4 illustrates three plots 20, 22, and 24 of average quality of service versus number users for three progressively decreasing average data rates. Plot 20 corresponds to the quality curve for a high average data rate, plot 22 corresponds to the quality curve for a moderate average data rate, and plot 24 corresponds to the quality curve for a low average data rate.

The first important feature in the plots is that the intersection of the plots with the vertical axis is progressively lower for lower link data rates. Below capacity limits, higher allowable data rates correspond to higher quality, since a high data rate allows more precise quantization of the parameters in the variable rate speech coder, resulting in cleaner sounding speech.

The second important feature in the plots is the intersections of the quality line with the three plots. The intersections of the quality line with each of the curves 20, 22 and 24 provides the capacity limit for the system at the respective data rates of curves 20, 22 and 24. The system capacities labeled CAP A, CAP B, and CAP C are the number of users that can access the system at the data rates of each of curves 20, 22 and 24. The capacity limit at a given data rate is obtained by dropping a vertical line, as shown in the diagram, from the intersection of the plot and the quality line to the horizontal axis representing the number of users. The capacity of the system increases for a fixed quality level as the data rate decreases.

Figure 5:
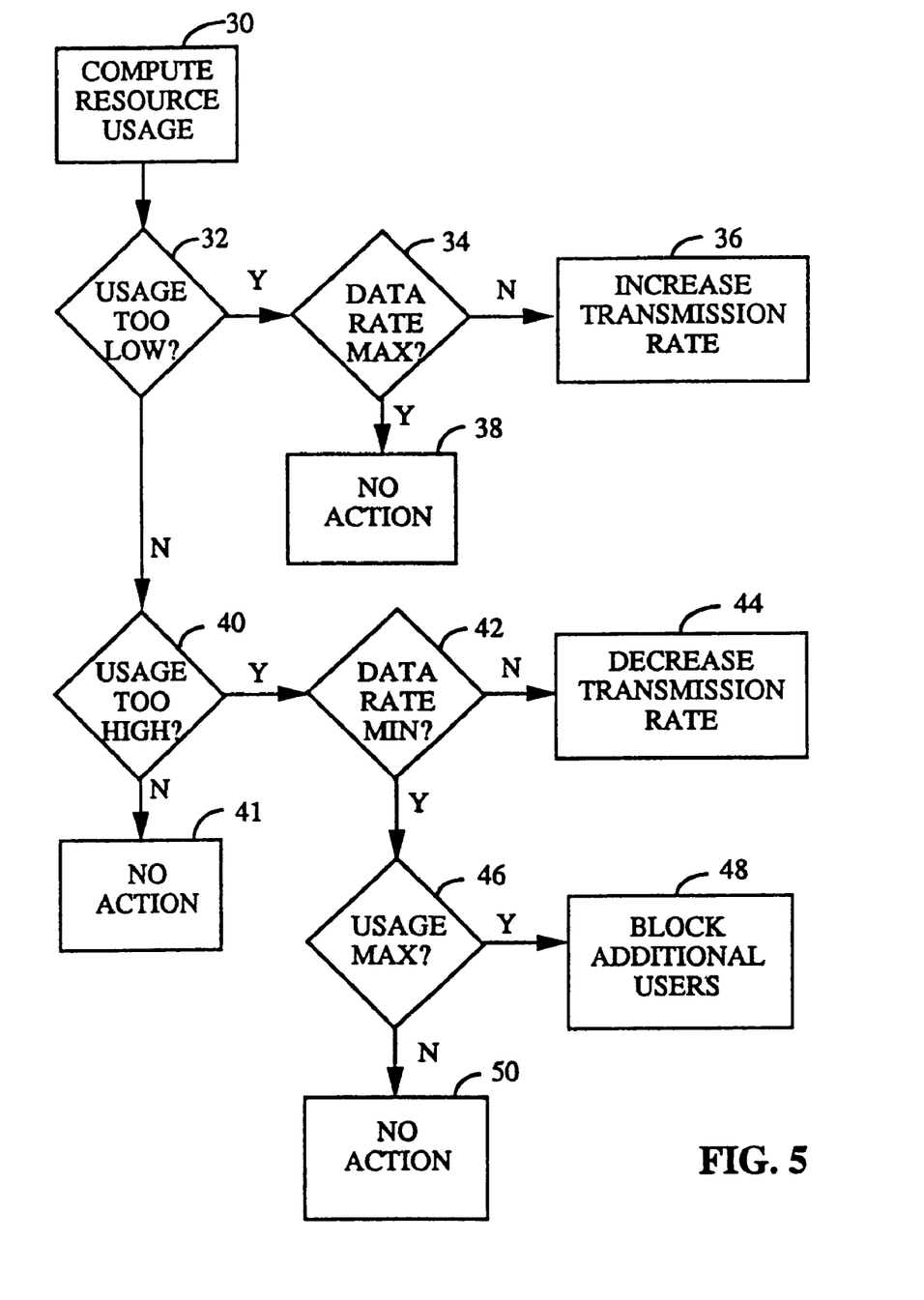
FIG. 5 is a flowchart of the system monitor and control operation.

FIG. 5 is a flowchart illustrating the method of maximizing the average quality by controlling the data rate of transmission on the system. At block 30 the amount of communications resource that is in use is determined, based on the number of users accessing the system on the given link and the data rate transmitted by each user. The usage value computed in block 30 is passed to block 32. In block 32 the usage value is compared against a lower threshold. If the usage value is below the lower threshold then the operation goes to block 34 where it is determined if the link is operating at a predetermined data rate maximum. If the system is operating at the predetermined data rate maximum, the operation moves to block 38 and no action is taken. If the system is operating below the predetermined data rate maximum, the operation proceeds to block 36 and the link data rate is increased.

If back at block 32 it is determined that the link usage is not too low, the operation proceeds to block 40 where the usage is compared against an upper threshold. If in block 40 the link usage is determined to be below the upper threshold, the operation proceeds to block 41 and no action is taken. If on the other hand, the link usage exceeds the upper threshold in block 40, the operation proceeds to block 42. In block 42, the system data rate is compared against a predetermined minimum. If the system data rate is greater than this predetermined minimum then the operation proceeds to block 44 where the link data rate is decreased.

If at block 42 the link data rate was determined to be equal to the minimum link data rate then the operation proceeds to block 46. At block 46 the system compares the usage to a predetermined usage maximum. If the communications resource is exhausted, that is the usage is equal to the predetermined maximum, then the operation proceeds to block 48 and access by any additional users is blocked. If the usage is below the predetermined usage maximum then, then operation proceeds to block 50 and no action is taken.

In TDMA systems, data rates can be modified by spreading data of a given user among a plurality of allocated time slots or combining the data of a plurality of users with selected ones of allocated time slots. In an alternative implementation variable data rates could be achieved in a TDMA system by allocating time slots of varying length to different users. Similarly, in FDMA systems data rates can be modified by spreading data of a given user among a plurality of allocated frequency sub-bands or combining the data of a plurality of users with selected ones of allocated frequency sub-bands. In an alternative implementation variable data rates in a FDMA system could be achieved by allocating varying frequency sub-bands sizes to different users.

In random access systems the probability of message collisions is proportional to the amount of information each user needs to send. Therefore, the data rate can be adjusted directly by sending varying size packets of data or by sending the packets at varying time intervals between transmission.

In the exemplary embodiment using a CDMA system, the amount of data necessary for transmission of speech is adjusted by use of a variable rate vocoder as detailed in U.S. Pat. No. 5,414,796 mentioned above. The variable rate vocoder of the exemplary embodiment, provides data at full rate, half rate, quarter rate and eighth rate corresponding to 8 Kbps, 4 Kbps, 2 Kbps and 1 Kbps, but essentially any maximum average data rate can be attained by combining data rates. For example, a maximum average rate of 7 Kbps can be attained by forcing the vocoder to go to half rate every fourth consecutive full rate frame. In the exemplary embodiment, the varying size speech data packet, is segmented and segments are provided at randomized times as is detailed in U.S. patent application Ser. No. 07/846,312 entitled "Data Burst Randomizer," assigned to the assignee of the present invention and incorporated by reference herein.

A useful way of looking at the issue of communications resource capacity is to view the available communications resource as a pie chart, where the whole pie represents the complete exhaustion of the communication resource. In this representation sectors of the pie chart represent fractions of the resource allocated to users, system overhead, and unused resource.

In a TDMA or FDMA system the whole of the pie chart may represent the number of available time slots or frequency sub-bands in a given allocation strategy. In a random access system, the whole of the pie chart may represent the message rate that is acceptable before message collisions grow so great as to make the transmission link unacceptable. In the exemplary embodiment of a CDMA system, the whole of the pie chart represents the maximum tolerable noise floor wherein the overhead and signal from all other users appear as noise in the reception of the message data to and from the remoter users. In any system configuration, referring back to FIG. 3, the whole of the resource pie represents the intersection of the quality line with the average quality versus number of users plot.

Figure 6:
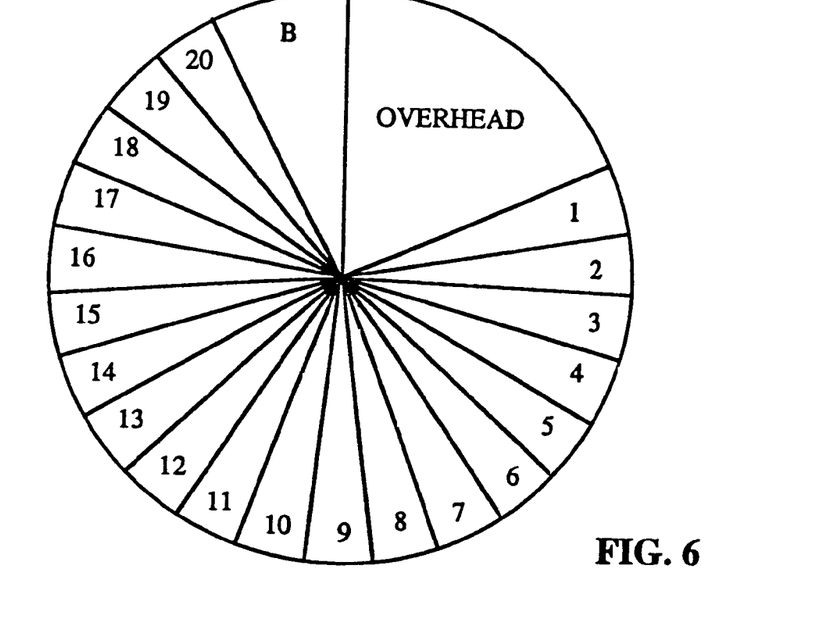
FIG. 6 is a communication resource pie chart for forward link communications.

FIG. 6 illustrates an example of a general forward link capacity pie chart. The first sector of the resource pie labeled OVERHEAD represents the portion of the transmission signal that does not carry message information. The OVERHEAD fraction of the pie represents the transmission of non-message non-user-specific data and in the exemplary embodiment is a fixed fraction of the communication resource though in other systems this overhead may vary with the number of users or other factors. The OVERHEAD may include base station identification information, timing information and base station setup information among other things. The OVERHEAD may include pilot channel usage of the communications resource. An example of a pilot channel is detailed in U.S. Pat. No. 5,103,459, entitled "System and Method for Generating Signal Waveforms in a CDMA Cellular Telephone System (CDMA)," assigned to the assignee of the present invention and incorporated herein by reference. Each of the following sectors numbered 1-20 represents a the message information directed to a particular user, where the users are numbered 1-20. The last sector of the pie, moving in a clockwise direction, is labeled with a B. The sector labeled with a B represents the remaining fraction of available communication resource before unacceptable link degradation occurs.

Figure 7:
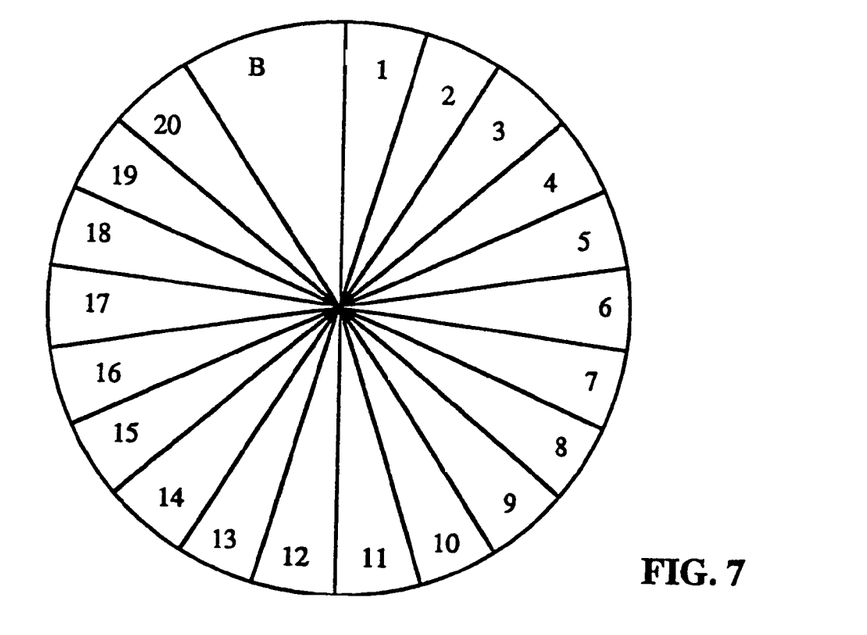
FIG. 7 is a communication resource pie chart for reverse link communications.

FIG. 7 is a resource pie chart for the reverse link communications. This pie chart represents the information received at the main transmission center or base station from the remote users. The only significant difference between this pie chart and the previous pie chart is in the reverse link there is no fixed OVERHEAD resource. It should also be noted that in the preferred embodiment each user uses the same fraction of communication resource in order to maximize the quality of service to all users. The method and apparatus for maintaining the condition wherein all users use the same fraction of received communication resource is detailed in U.S. Pat. No. 5,056,109 entitled "Method and Apparatus for Controlling Transmission Power in a CDMA Cellular Telephone System" assigned to the assignee of the present invention and incorporated by reference herein. In this approach, each remote user transmits at a power level such that it is received at the base station as all other remote users. Preferably, each remote user transmits at a minimum power level necessary to insure a quality communication link with a base station.

Figure 8:
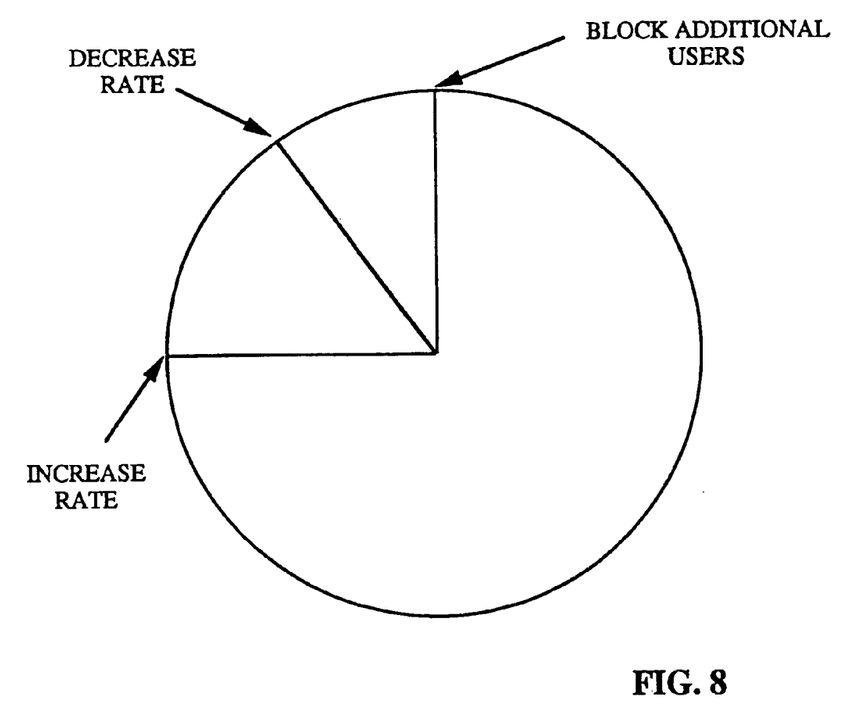
FIG. 8 is a communication resource pie chart illustrating the actions to be taken with respect to different fractions of resource usage.

FIG. 8 is an action pie chart that represents the actions to be followed with respect to the resource pie charts. Labeled on the pie chart of FIG. 8 are three points, a point marked INCREASE RATE, a point marked DECREASE RATE and a point marked BLOCK ADDITIONAL USERS. If the fraction of the resource pie for a given link exceeds the point marked DECREASE RATE, the transmission rate on that link should be decreased to improve the quality of service to the users. For example, if the data rate corresponding to plot 20 in FIG. 4 was being transmitted by all users and the number of users became greater than CAP A, the data rate would be decreased, and the system would then operate on plot 22 in FIG. 4. If the fraction of the resource pie for a given link falls below the point marked INCREASE RATE, the transmission rate on that link should be increased to improve the quality of service to the users. For example, if the data rate corresponding to plot 22 in FIG. 4 was being transmitted by all users and the number of users dropped below CAP A, the data rate would be increased and the system would operate on plot 20 in FIG. 4. If the pie reaches the point marked BLOCK ADDITIONAL USERS then any additional users should be blocked from accessing the system. Note that the only way the system would reach the BLOCK ADDITIONAL USERS point is by going through the DECREASE RATE point which implies that the rate could not be further decreased.

Figure 9:
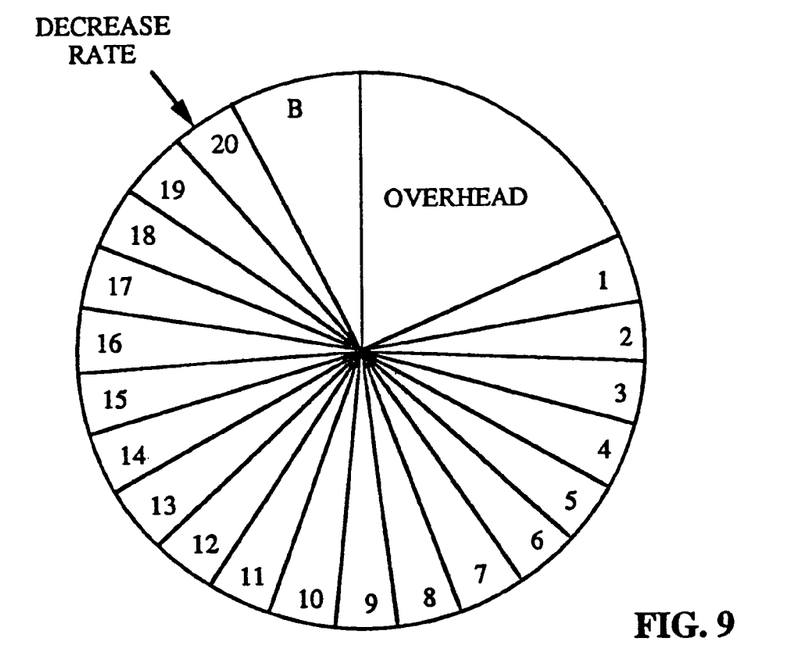
FIG. 9 is a communication resource pie chart illustrating conditions under which the data rate would be decreased by the control mechanism of the present invention
Figure 10:
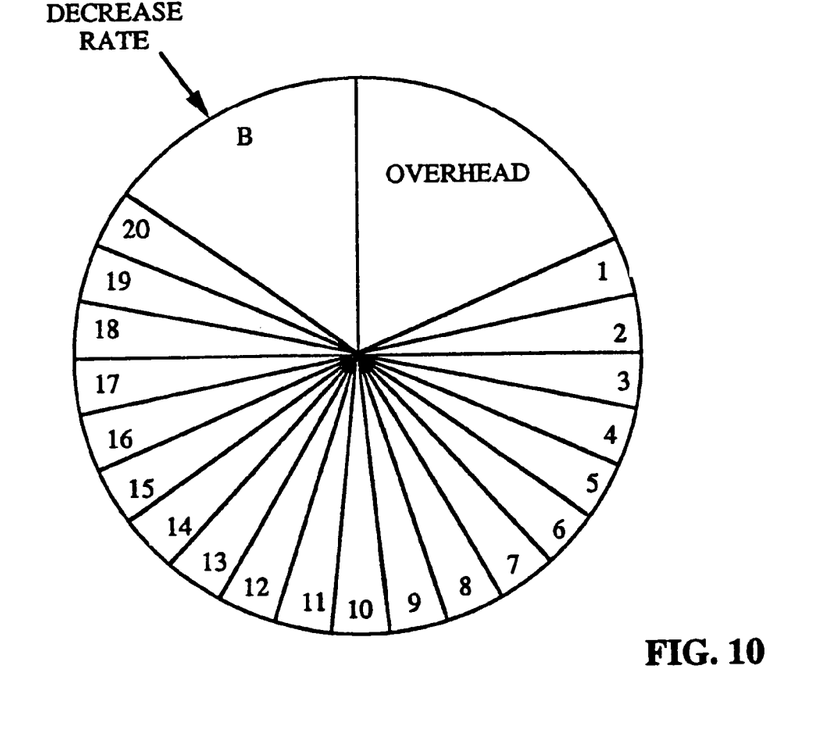
FIG. 10 is a communication resource pie chart illustrating the effects of decreasing the data rate of the previous communications resource.

FIGS. 9 and 10 illustrate the effects of decreasing the transmission rate on the resource allocation. In FIG. 8, the addition of user 20 has caused the resource allocation to surpass the point at which the transmission rate should be decreased. At this point the transmission rate is decreased and the resource pie for the same users looks like FIG. 9. Notice the unused portion of the resource pie labeled B is large enough to permit additional users to access the communication resource. Thus, additional users can access the communication system until the system requires the transmission rate to be decreased again. This process will continue until the rate is at a minimum. If this occurs, the system allows the pie to fill entirely and then any new users are prevented from accessing the system.

In contrast as users leave the communication resource then the fraction of the communication resource that is used decreases below the INCREASE RATE point and the system will increase the transmission rate. This can continue until the transmission rate is increased to a maximum rate or until no users are accessing the communication resource.

Figure 11:
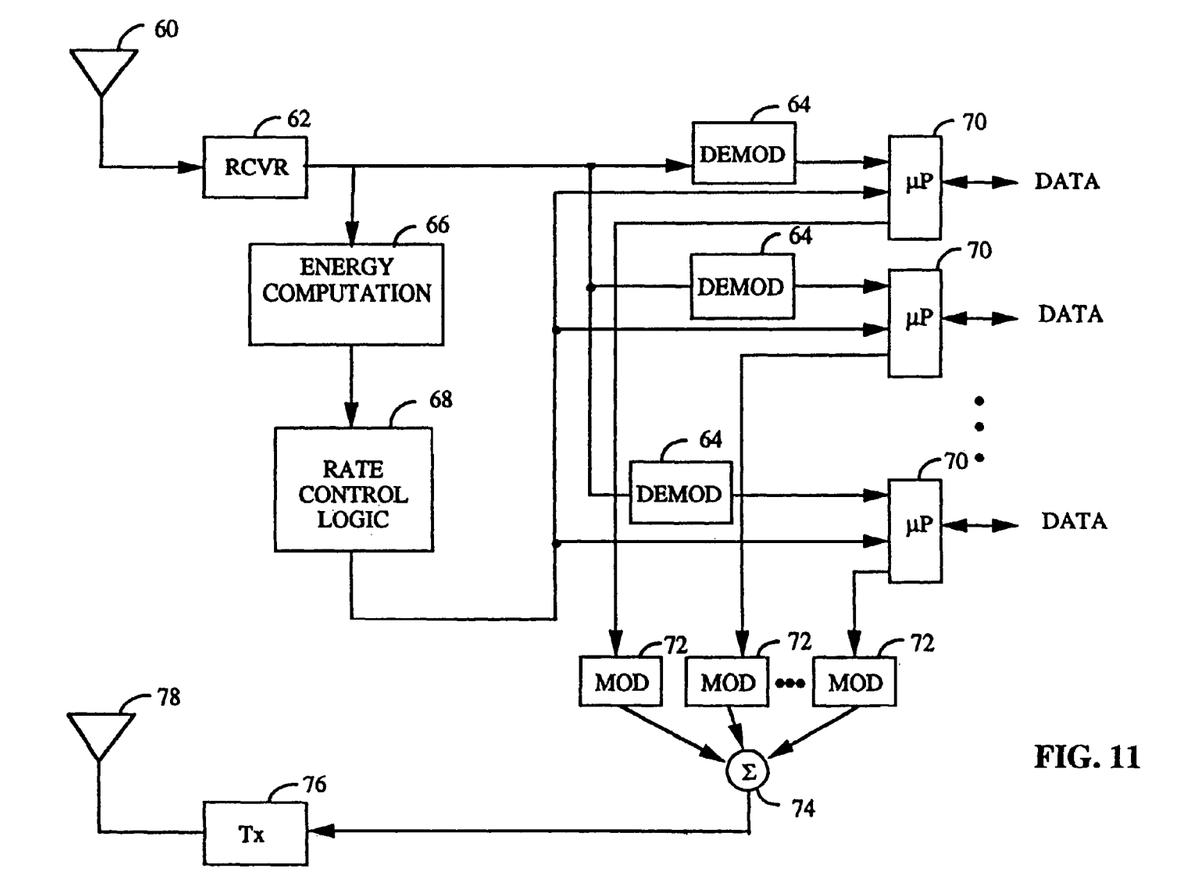
FIG. 11 is a block diagram of the monitor and control system for controlling reverse link communications located at the main communications center.

FIG. 11 illustrates a block diagram for the monitor and control of the reverse link communication resource usage at the main communications center, which may include the cell base station and the system controller. The signals from the remote users are received at receive antenna 60. The received signals are provided to receiver 62 which provides the data in analog or digital form to energy computation element 66 and demodulators 64. The computed energy value from energy computation element 66 is provided to rate control logic 68 which compares the received signal energy to a series of thresholds. In response to the comparisons, rate control logic 68 provides a rate control signal to microprocessors 70 when the signal energy is above an upper threshold or is below a lower threshold. In other embodiments, the rate control logic 68 could also be responsive to external factors which may affect the performance of the communications channel, such as weather conditions, etc.

The received signal from receiver 62 is provided to demodulators 64, where it is demodulated and the data for a specific user is extracted and provided to the corresponding microprocessor 70. In the exemplary embodiment, as detailed in U.S. Pat. No. 5,056,109 entitled "Method and Apparatus for Controlling Transmission Power in a CDMA Cellular Mobile Telephone System" assigned to the assignee of the present invention and incorporated by reference herein, the received data is provided by microprocessors 70 to selector cards (not shown) in a system controller 14 that selects a best received data from received data from a plurality of main communication centers (cells), each of which contains a receiver 62 and a demodulator 64, and decodes the best received data using a vocoder (not shown). The reconstructed speech is then provided to a public telephone switching network (not shown).

In addition, microprocessors 70 receive data for forward link transmission from the vocoders (not shown) through the data interface. Microprocessors 70 combine the reverse link rate control signal, when present, with the outgoing forward link data to provide composite data packets to modulators 72. In a preferred embodiment, ones of microprocessors 70 would selectively combine the reverse link rate control when present to with outgoing forward link data. In the preferred embodiment, ones microprocessors 70 are responsive to a signal indicative of overriding conditions where upon the reverse rate control signal is not combined with the outgoing forward link data. In alternate embodiment, certain ones of said microprocessors 70 would not be responsive to the reverse link rate control signal. Modulators 72 modulate the data packets and provide the modulated signals to summer 74. Summer 74 sums the modulated data and provides it to transmitter 76 where amplified and provided to transmission antenna 78.

Figure 12:
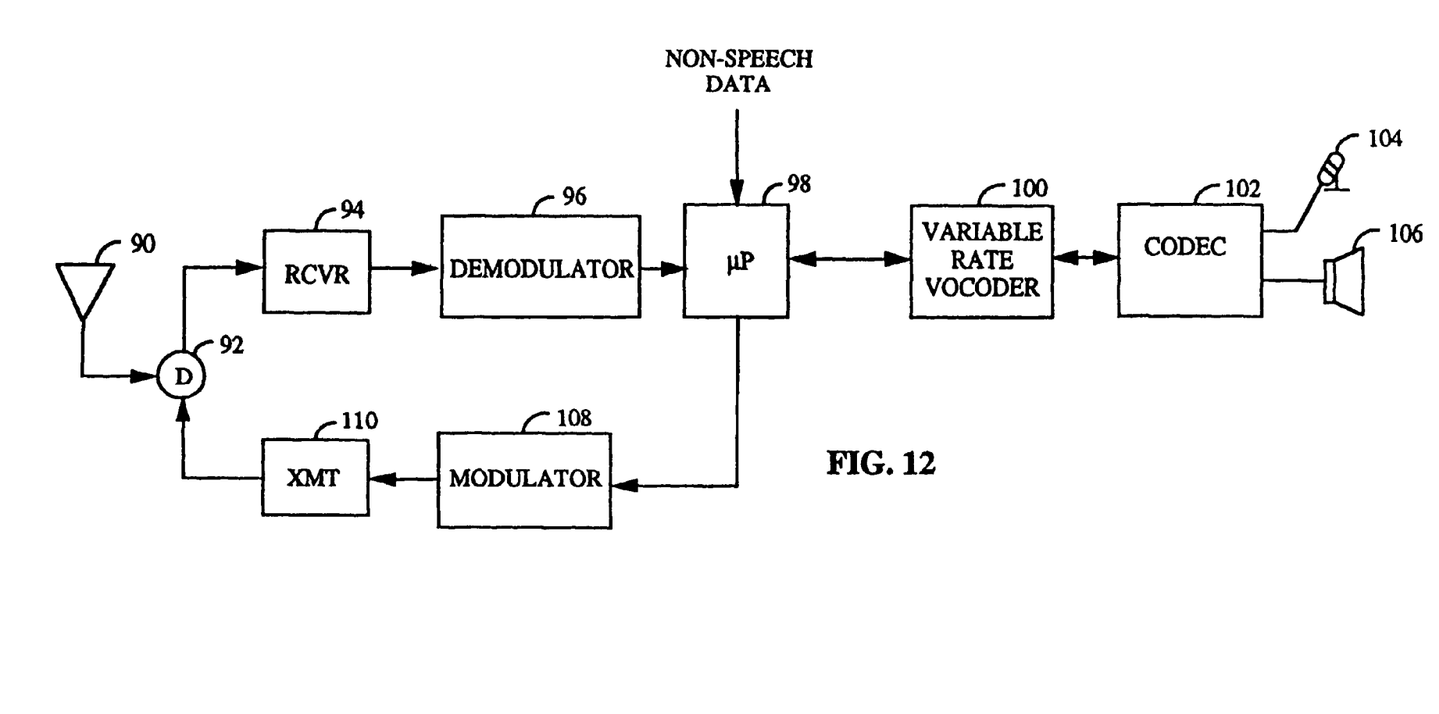
FIG. 12 is a block diagram of the monitor and control system for controlling reverse link communications located at the remote user.

FIG. 12 illustrates a block diagram of the remote user apparatus of the present invention for responding to the rate control signal provided in the exemplary embodiment by main transmission center 2 in FIG. 1. On the receive path, the signal that comprises encoded speech data and/or signaling data is received at antenna 90, which also serves as the transmission antenna by means of duplexer 92. The received signal is passed through duplexer 92 to demodulator 96. The signal is then demodulated and provided to microprocessor 98. Microprocessor 98 then decodes the signal and passes the speech data and any rate control data that is sent by the base station to the variable rate vocoder 100. Variable rate Vocoder 100 then decodes the encoded packet of speech data provided from microprocessor 98 and provides the decoded speech data to codec 102. Codec 102 converts the digital speech signal into analog form and provides the analog signal to speaker 106 for playback.

On the transmit path of the remote user, a speech signal is provided through microphone 104 to codec 102. Codec 102 provides a digital representation of the speech signal to the variable rate vocoder 100 which encodes the speech signal at a rate determined in the exemplary embodiment in accordance with the speech activity and the received rate signal. This encoded speech data is then provided to microprocessor 98.

In the exemplary embodiment, the rate control signal is a binary signal indicating to the remote user to increase or decrease the maximum data rate. This adjustment of the data rate is done in discrete levels. In the exemplary embodiment, the remote user will increase or decrease its maximum transmission rate by 1000 bps upon receipt rate control signaling from the cell base station. In practice, this reduces the overall average data rate by 400 to 500 bps, since the vocoder is only encoding the speech at the maximum rate 40-50% of the time in a normal two-way conversation. In the exemplary embodiment, the silence between words is always encoded at the lower data rates.

For example, if the remote user is currently operating with a maximum transmission data rate of full rate or rate 1 (8 Kbps), and a signal decrease its maximum data rate is received, the maximum transmission data rate will be decreased to ⅞ (7 Kbps) by forcing every fourth consecutive full rate frame of data to be encoded at half rate (4 Kbps). If on the other hand, the remote user is operating under control of the cell base station at a maximum transmission rate of ¾ (6 Kbps) and the cell base station signals the remote user to increase its maximum data rate, then the remote user will use a rate ⅞ (7 Kbps) as a maximum transmission data rate. In a simplified embodiment the rates could simply be limited to one of the discrete rates provided by variable rate vocoder 100 (i.e. rates 1, ½, ¼ and ⅛).

Microprocessor 98, also, receives non-speech data that can include signaling data or secondary data such as facsimile, modem, or other digital data that needs communication to the cell base station. If the digital data being transmitted by the remote user is of a form not conducive to variable rate transmission (i.e. some facsimile or modem data) then microprocessor 98 can decide based upon the service option of the remote user whether to vary the transmission rate in response to the rate control signal.

Modulator 108 modulates the data signal and provides the modulated signal to transmitter 110 where it is amplified and provide through duplexer 92 to antenna 90 and transmitted over the air to the base station. It is also envisioned in the present invention that the remote user could monitor the reverse link communication resource and respond in an open loop manner to adjust its transmission rate.

Figure 13:
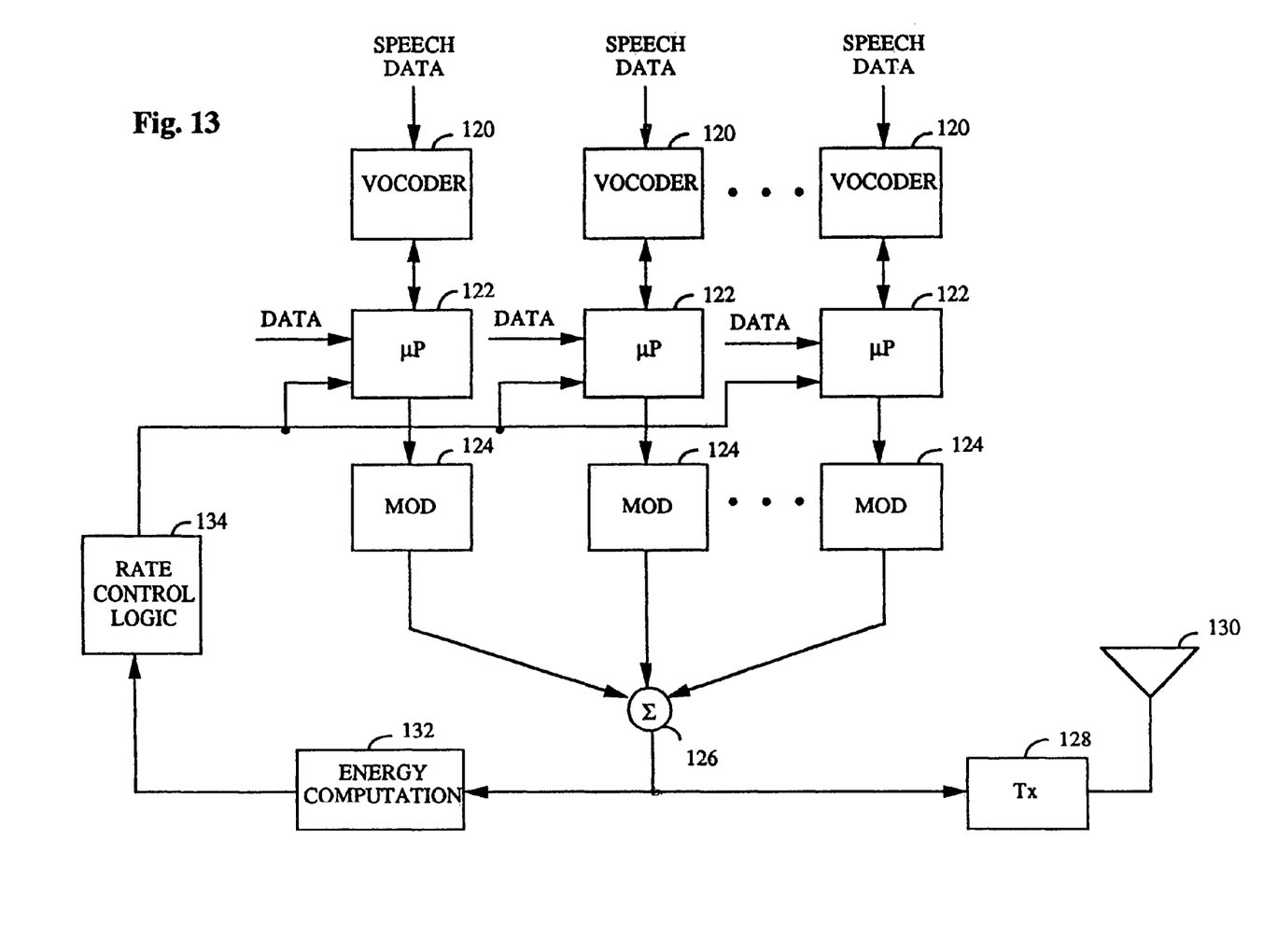
FIG. 13 is a block diagram of the forward link monitor and control apparatus.

FIG. 13 illustrates a block diagram of an exemplary forward link rate control apparatus. Speech data is provided to vocoders 120 where the speech data is encoded at a variable rate. In the present invention the encoding rate for the speech data is determined in accordance with the speech activity and a rate control signal when present. The encoded speech is then provided to microprocessors 122, which also may receive non-speech data from an external source (not shown). This non-speech data can include signaling data or secondary data (facsimile, modem or other digital data for transmission). Microprocessors 122 then provide data packets to modulators 124 where the data packets are modulated and provided to summer 126. Summer 126 sums the modulated signal from modulators 124 and provides the sum signal to transmitter 128 where the signal is mixed with a carrier signal, amplified and provided to antenna 130 for transmission.

The summed modulated signal from summer 126 is also provided to energy computation unit 132. Energy computation unit 132 computes the energy of the signal from summer 126 for a fixed time period and provides this energy estimate to rate control logic 134. Rate control logic 134 compares the energy estimate to a series of thresholds, and provides a rate control signal in accordance with these comparisons. The rate control signal is provided to microprocessors 122. Microprocessors 122 provide the rate control signal to vocoders 120 for control of the maximum data rate of speech data. Optionally, microprocessors 122 can also use the rate control signal to control the data rate of non-speech data sources (not shown). the rate control signal can be provided selectively to ones of microprocessors 122 or alternately selects ones of microprocessors 122 can be responsive to a globally provided rate control signal.

The open loop form of control on the forward link described above can also operate in a closed loop, which can be responsive to signals from the remote stations indicative of capacity limits being reached, such as high frame error rates or other measurable quantities. Rate control logic 134 can be responsive to external interferences of various kinds which may also affect the performance of the communications channel.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of controlling a vocoder encoding rate for speech transmitted to a remote unit on a wireless channel, comprising:
    obtaining a usage value indicating an amount of the wireless channel that is in use based on how many users are accessing the wireless channel and a data rate transmitted by each user;
    comparing the usage value with a channel usage threshold; and
    selecting a vocoder encoding rate based at least in part on a result of the comparing.

2. The method of claim 1, wherein the selecting comprises selecting a vocoder encoding rate from among a plurality of supportable vocoder encoding rates.

3. The method of claim 1, wherein the usage value is compared with a lower channel usage threshold value and an upper channel usage threshold value.

4. The method of claim 3, wherein the selecting comprises selecting a vocoder encoding rate based on at least one result of the comparing.

5. The method of claim 1, wherein the obtaining comprises receiving a rate control signal from the remote unit that indicates whether a maximum data rate should be increased or decreased.

6. The method of claim 5, wherein the rate control signal includes a measure of frame error rate for signals received by the remote unit.

7. A base station configured to control a vocoder encoding rate for speech transmitted to a remote station on a wireless channel, comprising:
    means for obtaining a usage value indicating an amount of the wireless channel that is in use based on how many users are accessing the wireless channel and a data rate transmitted by each user;
    means for comparing the usage value with a channel usage threshold; and
    means for selecting a vocoder encoding rate based at least in part on a result of the comparing.

8. The base station of claim 7, wherein the means for selecting comprises means for selecting a vocoder encoding rate from among a plurality of supportable vocoder encoding rates.

9. The base station of claim 7, wherein the usage value is compared with a lower channel usage threshold value and an upper channel usage threshold value.

10. The base station of claim 9, wherein the means for selecting comprises means for selecting a vocoder encoding rate based on at least one result generated by the means for comparing.

11. The base station of claim 7, wherein the means for obtaining comprises means for receiving a signal from the remote station.

12. The base station of claim 11, wherein the signal includes a measure of frame error rate for signals received by the remote station.

13. A base station configured to control a vocoder encoding rate for speech transmitted to a remote station on a wireless channel, comprising:
    an energy computation module configured to obtain a usage value indicating an amount of the wireless channel that is in use based on how many users are accessing the wireless channel and a data rate transmitted by each user; and
    rate control logic coupled to the energy computation module and configured to compare the usage value with a channel usage threshold and to select a vocoder encoding rate based at least in part on a result of the comparing.

14. The base station of claim 13, wherein the rate control logic is configured to select a vocoder encoding rate from among a plurality of supportable vocoder encoding rates.

15. The base station of claim 13, wherein the usage value is compared with a lower channel usage threshold value and an upper channel usage threshold value.

16. The base station of claim 15, wherein the rate control logic is configured to select a vocoder encoding rate based on at least one result of the comparison.

17. The base station of claim 13, further comprising a receiver coupled to the energy computation module and configured to receive a signal from the remote station.

18. The base station of claim 17, wherein the signal includes a measure of frame error rate for signals received by the remote station.

19. A processor for controlling a vocoder encoding rate for speech transmitted to a remote unit on a wireless channel, the processor being configured to:
    obtain a usage value indicating an amount of the wireless channel that is in use based on how many users are accessing the wireless channel and a data rate transmitted by each user;
    compare the usage value with a channel usage threshold; and
    select a vocoder encoding rate based at least in part on a result of the comparing.

* * * * *